United States Patent [19]

Franke et al.

[11] Patent Number: 5,159,474
[45] Date of Patent: Oct. 27, 1992

[54] TRANSFORM OPTICAL PROCESSING SYSTEM

[75] Inventors: Marc A. Franke; Roeland M. T. Hekker; Izhak M. Livny; Gregory S. Mercurio, all of Fairfield, Iowa; David P. Casasent, Pittsburgh, Pa.

[73] Assignee: E. I. du Pont De Nemours and Company, Wilmington, Del.

[21] Appl. No.: 465,576

[22] Filed: Jan. 18, 1990

Related U.S. Application Data

[63] Continuation of Ser. No. 920,513, Oct. 17, 1986, abandoned.

[51] Int. Cl.$^5$ .................... G02B 27/46; G03H 1/16; G06K 9/76
[52] U.S. Cl. .................. 359/29; 250/550; 250/208.6; 359/86; 359/559; 359/561; 382/31
[58] Field of Search ........... 350/162.12, 162.13, 350/162.14, 162.15, 3.7, 3.72, 331 T, 351; 382/31; 359/559, 560, 561, 564, 15, 19, 29, 86; 250/550, 206.2, 208.6

[56] References Cited

U.S. PATENT DOCUMENTS

| | | | |
|---|---|---|---|
| 2,798,605 | 7/1957 | Richards | 209/111 |
| 3,064,519 | 11/1962 | Shelton, Jr. | 88/1 |
| 3,305,834 | 2/1967 | Cooper et al. | 340/146.3 |
| 3,435,244 | 3/1969 | Burckhardt et al. | 250/219 |
| 3,450,889 | 6/1969 | Baker | 250/219 |
| 3,483,513 | 12/1969 | Burckhardt et al. | 340/146.3 |
| 3,497,704 | 2/1970 | Holmes et al. | 250/233 |
| 3,532,426 | 10/1970 | Lemmond | 356/71 |
| 3,536,376 | 10/1970 | Henning | 350/161 |
| 3,543,237 | 11/1970 | Cutler et al. | 340/146.3 |
| 3,549,800 | 12/1970 | Baker | 178/7.3 |
| 3,550,084 | 12/1970 | Bigelow et al. | 340/146.3 |
| 3,566,137 | 2/1971 | Lemmond | 250/219 |
| 3,581,280 | 5/1971 | Holeman | 340/146.3 F |
| 3,598,466 | 10/1971 | Friedl | 350/3.7 |
| 3,604,806 | 9/1971 | Redmann | 356/71 |
| 3,622,988 | 11/1971 | Caulfeld | 340/146.3 P |
| 3,633,035 | 1/1972 | Uchida et al. | 250/199 |
| 3,634,695 | 1/1972 | Barringer | 250/219 F |
| 3,636,512 | 1/1972 | Edwards | 340/146.3 |
| 3,689,772 | 9/1972 | George et al. | 250/211 J |
| 3,694,657 | 9/1972 | Brooks | 250/216 |
| 3,697,149 | 10/1972 | Van Heeckeren et al. | 350/3.5 |
| 3,726,997 | 4/1973 | Gnau et al. | 178/6.8 |
| 3,735,374 | 5/1973 | Rembault | 340/213 R |
| 3,737,856 | 6/1973 | Lehrer et al. | 340/146.3 Q |
| 3,744,879 | 7/1973 | Beard et al. | 350/162 |
| 3,764,979 | 10/1973 | Gabor | 340/146.3 |
| 3,776,616 | 12/1973 | Douklias | 350/162 SF |
| 3,778,166 | 12/1973 | Pease et al. | 356/71 |
| 3,779,492 | 12/1973 | Grumet | 244/3.17 |
| 3,781,113 | 12/1973 | Thomas | 356/71 |
| 3,788,749 | 1/1974 | George | 356/239 |
| 3,809,478 | 5/1974 | Talbot | 356/71 |
| 3,809,873 | 5/1974 | Klahr | 235/181 |
| 3,814,520 | 6/1974 | Baker et al. | 356/71 |
| 3,814,943 | 6/1974 | Baker et al. | 250/550 |
| 3,834,786 | 9/1974 | Carlsen | 350/3.5 |

(List continued on next page.)

OTHER PUBLICATIONS

Leith, E. N., Complex Spatial Filters For Image Deconvolution, *Proceedings of the IEEE*, vol. 65, No. 1, Jan. 1977.

Digitally Controlled Fourier Plane Filter, D. Casasent, Hybrid Processors pp. 202, 203, 204, 232, 233.

Primary Examiner—Bruce Y. Arnold
Assistant Examiner—Martin Lerner
Attorney, Agent, or Firm—Bell, Seltzer, Park & Gibson

[57] ABSTRACT

The Fourier transform optical processing system of the present invention includes generating an electrical signal in response to a first image and modulating a beam of coherent light with means that is responsive to the electrical signal. A Fourier transform image of the modulated coherent light beam is formed, an then detected. The detector provides a second electrical signal representative of the Fourier transformed image. Other aspects of the invention include comparing the second electrical signal to a reference electrical signal for producing an output signal representing any differences; optically preprocessing the image; detecting the Fourier transform image and generating signals representative of its Fourier transform characteristics; and modulating a coherent light beam using a liquid crystal or other spatial light modulating device.

44 Claims, 3 Drawing Sheets

U.S PATENT DOCUMENTS

| | | | |
|---|---|---|---|
| 3,853,403 | 12/1974 | Bentley | 356/71 |
| 3,869,697 | 3/1975 | Kawasaki | 340/146.3 P |
| 3,872,293 | 3/1975 | Green | 235/181 |
| 3,891,968 | 6/1975 | McMahon | 340/146.3 |
| 3,905,019 | 9/1975 | Aoki et al. | 340/146.3 P |
| 3,944,978 | 3/1976 | Jensen et al. | 340/146.3 E |
| 3,947,123 | 3/1976 | Carlson et al. | 356/39 |
| 3,972,616 | 8/1976 | Minami et al. | 356/71 |
| 3,984,802 | 10/1976 | Lippel, Jr. et al. | 340/5 H |
| 4,016,413 | 4/1977 | Bramley | 235/181 |
| 4,017,721 | 4/1977 | Michaud | 235/151.3 |
| 4,029,393 | 6/1977 | Dungan et al. | 350/331 T |
| 4,052,600 | 10/1977 | Wertheimer | 364/554 |
| 4,054,878 | 10/1977 | Diehl | 343/11 R |
| 4,063,799 | 12/1977 | Bernstein et al. | 350/162 SF |
| 4,067,645 | 1/1978 | Carlson et al. | 350/162 SF |
| 4,070,113 | 1/1978 | Frazer et al. | 356/104 |
| 4,084,255 | 4/1978 | Casasent et al. | 364/822 |
| 4,107,701 | 8/1978 | Sprague et al. | 346/108 |
| 4,110,116 | 8/1978 | Berg et al. | 350/358 |
| 4,118,099 | 10/1978 | Weiss et al. | 350/3.73 |
| 4,118,107 | 10/1978 | Parrent, Jr. et al. | 350/162 SF |
| 4,139,303 | 2/1979 | Carlson et al. | 356/39 |
| 4,150,360 | 4/1979 | Kopp et al. | 250/550 X |
| 4,153,335 | 5/1979 | Buchan | 350/150 |
| 4,153,336 | 5/1979 | Manami et al. | 350/162 SF |
| 4,173,441 | 11/1979 | Wolf | 356/431 |
| 4,174,179 | 11/1979 | Tschudi et al. | 356/71 |
| 4,174,885 | 11/1979 | Joseph et al. | 350/162 SF |
| 4,187,000 | 2/1980 | Constant | 350/162 SF |
| 4,198,125 | 4/1980 | Tatian et al. | 350/162 SF |
| 4,277,137 | 7/1981 | Upatnieks et al. | 350/162 |
| 4,282,511 | 8/1981 | Southgate et al. | 340/146.3 F |
| 4,299,443 | 11/1981 | Minami et al. | 350/162 SF |
| 4,322,163 | 3/1982 | Schiller | 356/71 |
| 4,330,775 | 5/1982 | Iwamoto et al. | 340/146.3 P |
| 4,340,300 | 7/1982 | Ruell | 356/71 |
| 4,357,676 | 11/1982 | Brown | 364/822 |
| 4,360,799 | 11/1982 | Leighty et al. | 340/146.3 P |
| 4,370,024 | 1/1983 | Task et al. | 350/162.12 |
| 4,378,495 | 3/1983 | Miller | 250/223 |
| 4,383,734 | 5/1983 | Huignard et al. | 350/162.13 |
| 4,387,989 | 6/1983 | Pirich | 356/71 |
| 4,389,093 | 6/1983 | Jackson | 350/162.14 |
| 4,403,294 | 9/1983 | Hamada et al. | 364/507 |
| 4,414,566 | 11/1983 | Peyton et al. | 358/101 |
| 4,433,385 | 2/1984 | De Gasperi et al. | 364/554 |
| 4,445,141 | 4/1984 | Benton et al. | 358/294 |
| 4,449,144 | 5/1984 | Suzuki | 358/105 |
| 4,460,247 | 7/1984 | Hilsum et al. | 350/331 T |
| 4,462,046 | 7/1984 | Spight | 358/101 |
| 4,477,829 | 10/1984 | Ziman et al. | 358/1 |
| 4,478,481 | 10/1984 | Fusek et al. | 350/3.85 |
| 4,484,081 | 11/1984 | Cornyn, Jr. et al. | 250/563 |
| 4,490,849 | 12/1984 | Grumet et al. | 382/31 |
| 4,490,851 | 12/1984 | Gerhart et al. | 382/43 |
| 4,511,986 | 4/1985 | Bellar et al. | 364/576 |
| 4,513,441 | 4/1985 | Henshaw | 382/43 |
| 4,516,833 | 5/1985 | Fusek | 350/162.12 |
| 4,544,267 | 10/1985 | Schiller | 356/71 |
| 4,556,985 | 12/1985 | Hongo | 382/30 |
| 4,566,757 | 1/1986 | Fusek et al. | 350/162.12 |
| 4,573,197 | 2/1986 | Crimmins | 382/22 |
| 4,573,198 | 2/1986 | Anderson | 382/31 |
| 4,588,293 | 5/1986 | Axelrod | 356/239 |
| 4,624,367 | 11/1986 | Shafer et al. | 209/577 |
| 4,637,055 | 1/1987 | Taylor | 382/31 |
| 4,637,056 | 1/1987 | Sherman et al. | 382/31 |
| 4,645,973 | 9/1987 | Yu | 350/162.13 |
| 4,715,683 | 12/1987 | Gregory et al. | 350/3.66 |
| 4,763,992 | 8/1988 | Takada et al. | 350/331 T |

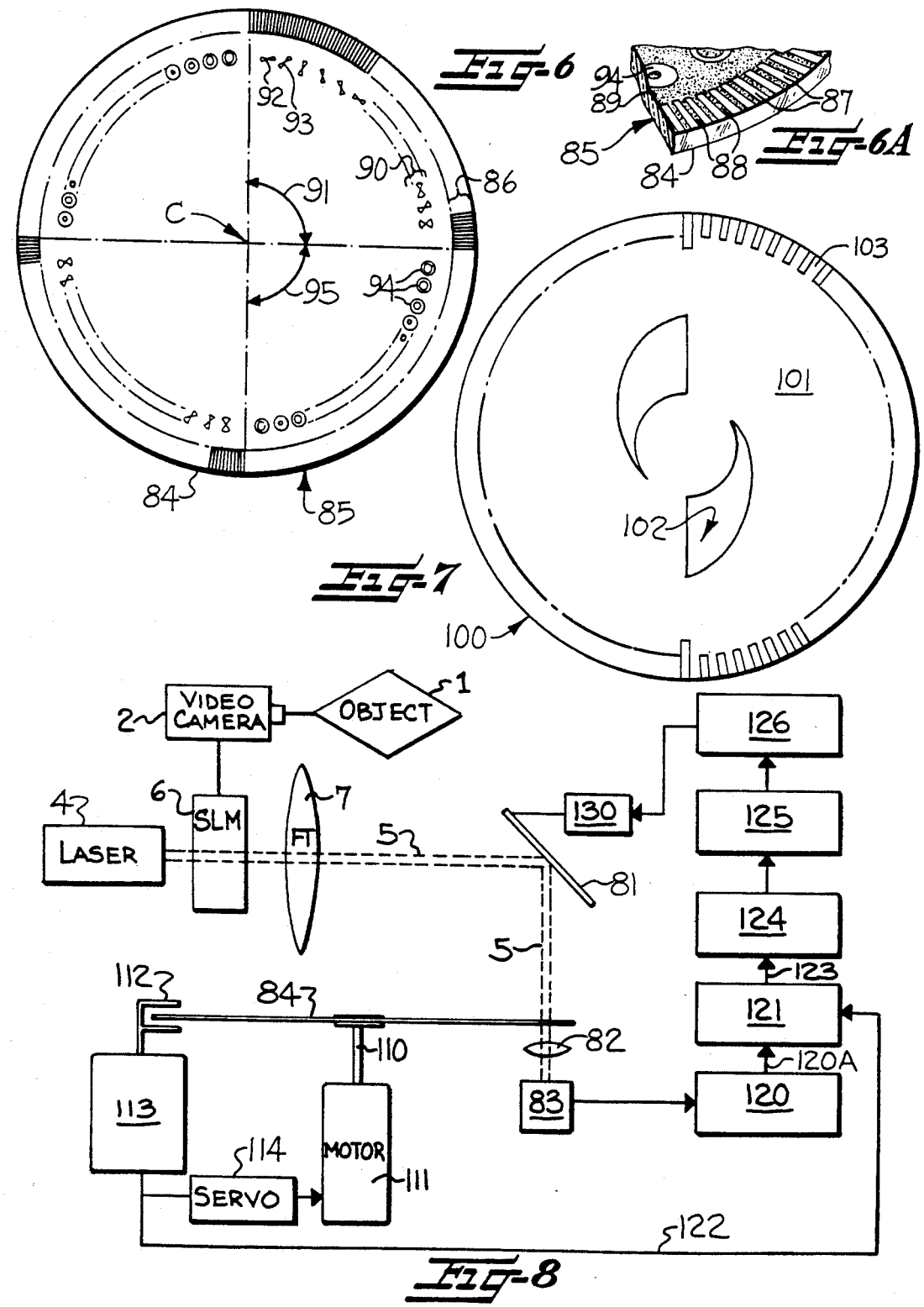

TRANSFORM OPTICAL PROCESSING SYSTEM

This application is a continuation of application Ser. No. 07/920,513, filed Oct. 17, 1986, now abandoned.

FIELD OF THE INVENTION

This invention relates to an inspection system where the image of the object to be inspected is processed optically using a Fourier transform image.

BACKGROUND OF THE INVENTION

Machine vision or inspection systems have become a vital component in integrated manufacturing systems. They can sort, package, and perform defect analysis without human intervention. For instance, by inspecting holes being drilled the system can determine if a drill bit is worn. However, most machine vision systems are based upon digital electronic technology that uses serial or one dimensional processing. For instance, an image is captured and stored as a matrix of electrical signals. The image is then preprocessed to enhance edges, improve contrast, and otherwise isolate the object to be recognized. A comparison function compares the enhanced image to one or more stored reference images. These functions are typically performed by standard microelectronic, digital equipment on a bit-by-bit or vector basis. Accordingly, the techniques are typically serial and inherently one dimensional, whereas the images being processed are two dimensional. This dichotomy results in very intensive processing requirements, is particularly difficult for one dimensional digital equipment, and takes a relatively long time to complete. Digital processing hardware has been enhanced and the software and algorithms have been improved to provide some improvements in prior art machine vision systems. However, these improvements have come at the expense of additional system complexity, system costs and programming complexity.

In some systems, the image to be processed is converted into a Fourier domain. The Fourier transform maps all of the information about the image of the object into a very useful, symmetrical pattern which represents the object in terms of its spatial frequencies. However, the calculation of a Fourier transform on a digital computer is extremely intense, and may take a computer as powerful as a Micro Vax II about a minute to complete. Even powerful and expensive state of the art array processors take a full second to merely produce the transform. In modern industrial plants, the production line rates are often a full order of magnitude faster than this.

Accordingly, it is an object of the present invention to provide an optical processing system.

It is a further object of the present invention to provide an optical processing system that can rapidly provide an electrical signal representing the Fourier transform of an image of an object.

It is a still further object of the invention to provide an optical processing system that utilizes a Fourier transform of the image being processed to produce an electric output signal characteristic of any differences between the image being processed and a reference image.

It is a still further object of the present invention to provide an improved spatial light modulator to impress the image of the object being processed onto a coherent light beam.

These and other objects, which will become apparent from this application, are accomplished by the Fourier transform optical processing system of the present invention. The method and apparatus of the present invention include generating an electrical signal in response to a first image and modulating a beam of coherent light with means that is responsive to the electrical signal. A Fourier transform image of the modulated coherent light beam is formed, an then detected. The detector provides a second electrical signal representative of the Fourier transformed image. Other aspects of the invention include comparing the second electrical signal to a reference electrical signal for producing an output signal representing any differences; optically preprocessing the image; detecting the Fourier transform image and generating signals representative of its Fourier transform characteristics; and modulating a coherent light beam using a liquid crystal or other spatial light modulating device.

BRIEF DESCRIPTION OF THE DRAWINGS

FIGS. 6, 6A and 7 illustrate alternate embodiments of sampling disks for use in a Fourier transform detector.

FIG. 8 is a schematic block diagram illustrating a second embodiment of the system of the present invention.

DESCRIPTION OF THE INVENTION

Figure 1:
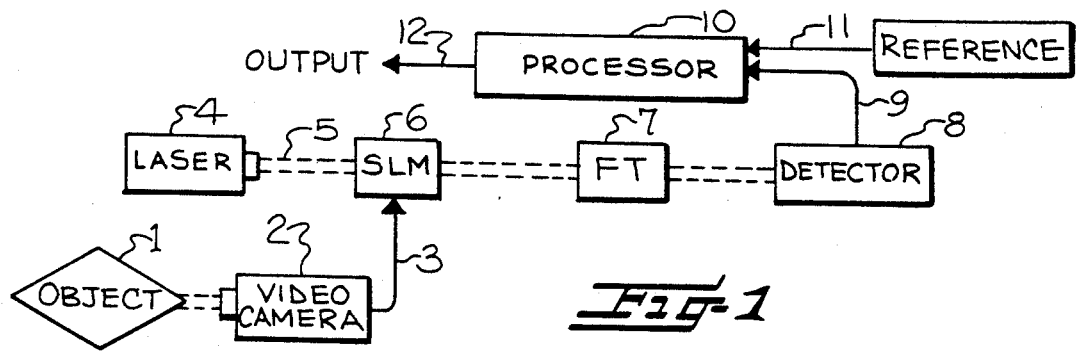
FIG. 1 is a schematic block diagram illustrating one embodiment of the system of the present invention.

FIG. 1 is a block diagram illustrating one embodiment of the optical processing system of the present invention. The image of an object 1 to be processed is received by a device such as a video camera 2 that generates a first electrical signal in response to the image 1. A laser 4 provides a beam of collimated light 5 that is incident upon a spatial light modulator 6. The modulator forms an image of the object in response to the first electrical signal, and the image is transferred to the coherent light beam. A Fourier transform image of the modulated coherent light beam is formed by the means 7 and focused upon the detector 8. The detector generates a second electrical signal on line 9 that is received by a processor 10 and compared to a reference signal representing a known image on line 11. The processor provides an output signal on line 12 representing the differences between the known image and the object.

The object 1 to be optically processed may be the actual object, such as a bottle, can, metal part, etc., or the image of an object that is generated in a focal plane for the video camera. Alternatively, it may be a preprocessed image that has been enhanced or filtered to highlight certain features or suppress a background, or it may be a presentation of the Moire interference fringes representing the three dimensional features of the object.

The image of the object is brought into the optical processing system by some means for generating an electrical signal in response to the image, such as a standard video camera 2. It may be any of several video cameras that are currently commercially available and have, for example, an RS-170 electric output. The output is present on line 3. While the image output of a standard video camera is readily decoded and transformed into a recognizable image by a commercially available television, other means, such as an electronic or electro-mechanical scanner, may be used.

A laser, or other device, provides a coherent beam of light 5 and defines an optical path for the optical processing system. It may be a laser diode or gas laser. The output power from the laser may be monitored by a photodetector 15 (FIG. 2) which intercepts a reverse beam from the laser, or a portion split from the output beam. The signal from the photodetector is used as part of a feedback loop to adjust the output power from the laser. The optical path in FIG. 1 is illustrated as being linear, although it may be bent as necessary or desirable using mirrors, prisms, or other suitable means.

A spatial light modulator 6 is disposed in the optical path and displays the image captured by the video camera 2 as represented by the electrical signal on line 3. The spatial light modulator of the present invention may be a liquid crystal device, as is commercially available. A liquid crystal device typically comprises a liquid crystal cell sandwiched between a pair of polarizers. The liquid crystal cell comprises individually addressable liquid crystal modules that are disposed in a two dimensional array. The tilt and twist of each liquid crystal module or pixel varies with applied voltage, and this affects the polarization of the light incident upon the cell. The device polarizers are aligned with each other. If the liquid crystal device is driven by a standard video signal, such as the output from a standard video camera, the image will be generated on the liquid crystal device one pixel at a time, in a manner similar to the way an image is generated on a standard television receiver.

Assuming that the video camera has a standard video signal output, it will typically scan the object one pixel at a time across a first horizontal line, retrace to a second horizontal line, and scan that line one pixel at a time. This sequence continues until the entire image has been scanned, and usually takes 33 milliseconds.

The pixel response time of a liquid crystal device is a complicated function of the material, temperature, and applied signal. Generally, the time period may be divided into a rise time (the time to achieve 90% of maximum transmission), a retention time (the time it stays above 90%), and fall time (the time to fall from 90% to some smaller threshold value). For the succeeding Fourier transformation of the image to be valid, it must be made at a time when the image quality is good and the entire image is displayed on the spatial light modulator. Depending upon the response time of the liquid crystal device, the speed with which the video signal is supplied, and the retention and fall times for the liquid crystal device, some of the pixels may have decayed while others have not yet peaked, or may not have been transmitted. Not only will the image be incomplete, image quality and contrast may suffer. On the other hand, if the image on the liquid crystal device has not decayed by the time that the signal representing the new image is provided, the new image will be contaminated and the modulation of the coherent light beam will not accurately represent the image presented.

To resolve these problems, an active liquid crystal display using built-in thin film transistors to hold each pixel value may be desirable. Alternatively, one may use a frame buffer which electrically stores and maintains an entire image or frame from the video camera and continuously refreshes or quenches the image on the liquid crystal device. The design of a device to accept the standard video camera output and adapt it to a two dimensional frame buffer compatible with a liquid crystal device is well within the capabilities of one skilled in the art of electronic circuit design.

Still further improvement may be made in the use of a liquid crystal device for a spatial light modulator by increasing the response time of the device, but this also typically results in a reduction in contrast. For instance, a thinner layer of liquid crystal modules has a faster response time, but less image contrast. To provide acceptable contrast at longer wave lengths of coherent light, a thicker layer of liquid crystal modules is preferred in the present invention, such as in the range of 3 to 7 microns thick. The response time can be improved by heating the liquid crystal device. In addition, it is desirable to maintain the device at a constant temperature to ensure that its response time is uniform. This may be done, for example, by placing the liquid crystal device in a heated cavity or heating it around the edges with resisters or thermal tape. The temperature is typically maintained in the range of 35° to 50° C. and a thermistor may be used to provide an electric feedback signal to maintain the device at the predetermined temperature. On the other hand, it may be desirable to cool the liquid crystal device to increase the retention time. The design of an appropriate temperature control circuit is well within the capabilities of one skilled in the art of electrical circuit design.

To ensure that phase distortions are not introduced into the Fourier transform image, optical flatness of the surfaces of the spatial light modulator is essential. The lack of optical flatness distorts and scatters the coherent light, making it impossible to generate the accurate coherent transformations required for optical processing. The optical correction may be done with an optical element such as a lens, or through the use of a correcting hologram having optical properties that are the inverse of any phase or other wavefront distortions. The method of making such a hologram to compensate for the unwanted spatial phase variations are disclosed in *Optics Letter*, Jun. 1986, pages 398-400, D. Casasent and S. Xia, which is incorporated herein.

The coherent light beam 5, modulated with the image of the object by the spatial light modulator, is incident upon still further means in the optical path for forming the Fourier transform or signature of the image of the object. The Fourier transform presents all information about the image mapped into a symmetrical pattern which represents the object in terms of its spatial frequencies. Visual features that are close together create high spatial frequencies and those features that are farther apart create lower spatial frequencies. Low frequencies are distributed toward the center of the transform and the higher frequencies farther away from the center toward the outer edge. The orientation of the features creating these frequencies are also mapped with vertically distributed features having their frequencies vertically distributed in the transform, and horizontally distributed features having their frequencies distributed horizontally in the transform. If the image is rotated, the frequency distribution rotates in the same fashion. This predictable mapping occurs on all features in the image regardless of the position of the feature. If a portion of the image moves to another place in the overall view, the Fourier transform will be basically unaffected for those visual features within the portion that moved. The only change will be if the features are now in a new spatial relationship to the rest of the items in the overall view. This characteristic provides "shift invariance" to the mapping of the Fourier transform for each object image. The Fourier transform is also symmetrical from top to bottom and from left to right so that each semicircle of the image contains exactly the same information. This symmetry is the basis for the design of the detector, with one half decoding the frequency distribution and the other half decoding the frequency orientation.

The Fourier transform is generated by a device such as a high quality glass lens transforms the information and focuses it into the optical plane of the lens. The lens performs the Fourier transform because it approximates a quadratic phase function. As an alternative, a hologram of a quadratic phase function will also perform a Fourier transform. In addition, the hologram may contain other transmission functions besides the quadratic phase function, and may, for instance, provide the phase correction for the spatial light modulator or other optical elements in the optical path. For instance, the hologram may be the complex conjugate of the phase function of the liquid crystal device multiplied by the desired quadratic phase function of the Fourier transform. When this hologram is illuminated by a plane wave, it provides an optically flat, phase compensated Fourier transform of the image modulated onto the coherent light beam by the spatial light modulator.

Figure 2:
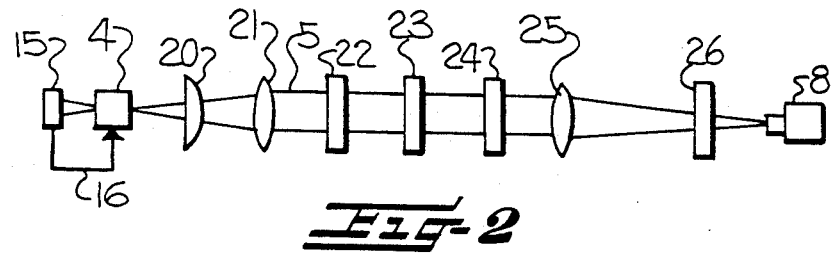
FIG. 2 is a schematic block diagram illustrating one embodiment of the optical path for the present invention.

Referring to FIG. 2, the elements in the optical path may comprise the laser 4 which provides the coherent light beam 5. As illustrated, the forward beam may be divergent and may have an elliptical cross section. An imaging system may be used as necessary or desirable to collimate the beam and circularize its cross section. This may include, for example, cylindrical lenses 20, 21. The polarization axis of the coherent light is preferably aligned with the polarization axis of the liquid crystal device 23, or, in the alternative, an input polarizer 22 may be used.

The collimated, polarized light beam passes through the spatial light modulator 23 which contains an image of the object to be processed. The spatial light modulator may comprise, for example, a liquid crystal cell or a magneto-optic device of the type available from Semetex, a division of Litton Industries, Inc. A holographic optical element or other device 24 may be used to correct any wavefront distortion introduced by the liquid crystal device or other elements in the optical path. A lens 25 forms the two dimensional Fourier transform of the image on the liquid crystal device, focusing the transformed image at the detector 8. As noted earlier, lens 25 may also be a holographic optical element, or may be combined with the holographic optical element 24. A polarizer 26 is disposed in the optical path and cooperates with the liquid crystal cell to from the image. The polarizers 22, 26 are normally affixed directly to the liquid crystal cell, but they may be removed therefrom to minimize or correct wavefront distortion or otherwise improve the image. The optical path ends at the light detector 8 and any further processing takes place in the digital electronic circuitry. FIGS. 1 and 2 illustrate a linear optical path, which requires that the spatial light modulator and other elements disposed in the optical path transmit light therethrough. In the alternative, the optical path may be bent, using mirrors, prisms, or other devices. The spatial light modulator 6, 23 may also be of the reflective type where the angle of incidence of the coherent light beam may be, for example, 20 degrees.

The light detector is placed in the focal plane of the Fourier transform image. It detects the Fourier transform image of the modulated coherent light beam and generates an electrical signal on line 9 in response thereto. The image is detected by measuring the amount of light incident on the various spatial domains of interest, as illustrated by the wedges and rings in FIG. 4. These domains may be physically defined on a semiconductor array, as illustrated in U.S. Pat. No. 3,689,772 to George. Alternatively, they may be defined by electronically segmenting a rectangular or circular two dimensional matrix into wedges and rings as illustrated in FIGS. 3 and 4, or by sampling the Fourier transform segments sequentially in time by passing apertures on a rotating disk through the Fourier plane, as illustrated in FIGS. 6-8.

Figure 3:
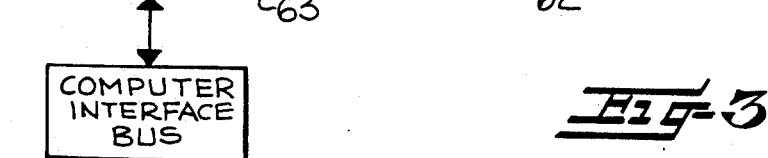
FIG. 3 is a schematic block diagram illustrating one embodiment of the means for detecting the Fourier transform image and generating an electrical signal representative thereof.
Figure 4:
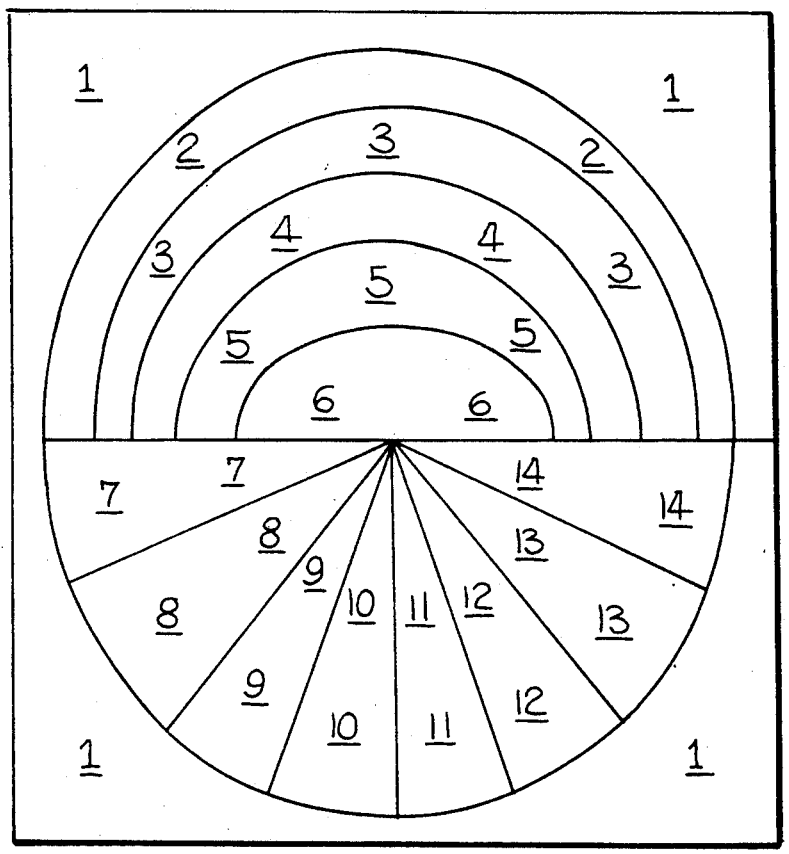
FIG. 4 illustrates the regions of a wedgering device for detecting the Fourier transform and generating an electrical signal.

Referring to FIG. 3, the detector may comprise a light sensor which generates electric signals representing a two dimensional image of the Fourier transform, electronic circuitry which digitizes the image and stores it for analysis, and electronic circuitry which adds together the intensity of each of the image pixels comprising the Fourier image in each of the wedge and ring shaped domains 2-14 identified in FIG. 4.

FIG. 3 generally illustrates circuitry for detecting the Fourier transform image. It detects the modulated coherent light beam, divides the light beam into a series of semicircular and wedge shaped portions, and sums the intensity of the light in each of the individual semicircular or wedge shaped portions. The intensity of the light in each of these portions is a representation of the Fourier signature of the object being inspected.

More specifically, FIG. 3 illustrates a camera 30 such as a video camera described above that has a standard composite video television output. This includes an area portion signal (line and pixel location within the line) identifying an area within the Fourier transform image, and a corresponding video or feature portion signal that identifies a feature of the Fourier transform image in the located area. The area portion signal may be decoded to represent a particular line and pixel location, and the feature signal may be decoded to represent the intensity of the image at the corresponding area location. The camera output signal on line 31 is provided to the camera input sync separator 32 which separates the area portion signal from the feature portion signal.

The area portion signal is provided on line 33 to the phase lock loop device 34 which isolates and decodes the area portion signal and outputs a synchronizer signal on line 35 to the line/pixel counter 36. The line/pixel counter converts the synchronizer signal to an address signal on line 38 and a timing signal on line 39.

The clock generation device 40 receives the synchronizing signal on line 39 and provides a signal on line 44 to the cycle counter to identify each successive single video frame. Each successive video frame initiates a new cycle for the detector.

The address signal on line 38 identifies specific locations in a video frame buffer memory 45. The video frame buffer memory is, in this example, a 512 by 512 by 8 bit memory. Thus, the image storage area consists of 512 lines having 512 pixels per line, and the line/pixel counter converts the area location signal to the corresponding address signal for the video memory. Each storage position stores an 8 bit word representing an address for the summing RAM 46. The address for RAM 46 is output from the video memory on line 48, through multiplexer 47, and onto line 49. The video frame buffer memory 45 functions as a real time look-up table which relates the line and pixel position of the camera 30 to the zones defining the wedge-ring pattern of FIG. 4. Thus, as the camera scans the Fourier transform image from left to right along a line, the video memory converts the line/pixel location signal to a signal representing one of the wedge or ring shaped domains or zones 1-14 in FIG. 4.

An important feature of the video frame buffer memory is that any desired pattern of pixel summation can be preloaded into the video frame buffer memory. This permits one to personalize the means for detecting the Fourier transform image to isolate certain features and provide the desired degree of resolution. Additional advantages of defining the wedge and ring shaped domains in a programmable look-up table means that the number of domains may be modified easily for different types of recognition problems. Instead of 64 wedges and 64 rings, it would be possible to provide 128 wedges and 128 rings. The detector may also be reconfigured into rings only, or wedges only, or still other different geometries. A critical function in any Fourier sampling system is to attenuate the central DC peak light energy that always appears in the center of the Fourier transform image. The central peak is orders of magnitude higher in energy than the more distant points, but they contain the information of interest. The present embodiment allows hardware or software control of the attenuation of the DC peak, including narrowing and widening as the situation requires. This embodiment also avoids certain critical problems of alignment and centering which are inherent in optical systems and other Fourier transform sensing approaches.

The second portion of the means for detecting the Fourier transform processes the feature or video portion of the image signal. In this embodiment it comprises an adder section that also processes the pixel information in real time. It sums the intensity of the current Fourier transform image pixel with the stored value of all previously scanned pixels in the same domain, and stores the result in a memory location specified by the 8 bit address data obtained from the frame buffer memory. Referring to FIG. 3, the video signal from the camera input sync separator is provided on line 51 to the analog to digital converter 52. The digital output on line 53 is an 8 bit representation of the intensity of the incident modulated coherent light beam at the area (line and pixel location) being detected by the camera, i.e. the current intensity signal. The converter 52 may operate at rate of 10 MHZ, and the data is passed to the 20 bit adder 54. Adder 54 sums the current intensity signal on line 53 with the signal on line 57 representing the sum of the intensity of all pixels previously scanned in the same domain of the same Fourier transform image. This is done as follows.

During analog to digital conversion of the feature portion signal, the line/pixel counter 36 addresses the video frame buffer memory 45 to convert the corresponding area portion signal to a zone or domain address signal, which represents one of the wedge or ring domains 1-14 illustrated in FIG. 4. This address signal from the video memory is routed through the 8 bit multiplexer 47 via line 49 to the summing RAM 46.

The address presented to the summing RAM 46 from the video memory identifies the location storing a 20 bit word which represents the summation of all pixel locations previously scanned for the wedge or ring domain that encompasses the current pixel location. The data representing this sum is provided on line 55 to the 40 bit multiplexer 56 and output on line 57 to the 20 bit adder 54. In adder 54 the data representing the intensity of the current pixel location is added to the data representing the summation of all previous pixel locations within the wedge or ring domain identified by the video memory. This addition is performed with an integer accuracy of 20 bits at real time rates. The data representing the result of this addition is placed on line 60 and stored back in the summing RAM 46 in the location specified by the current address pointer from video memory 45. This addition and substitution process continues until the intensity for each pixel in each wedge or ring domain has been summed for the entire Fourier transform image.

The process of adding the data representing the intensity of each of the pixel locations is initiated by a control signal from the cycle counter 61. At the beginning of each video frame, the cycle counter receives a signal on line 44 from the clock generator 40 and enables the summing RAM 46 via write enable line 67 so that data may be stored therein during the time that the entire frame is scanned, i.e. 33.3 milliseconds. After the entire frame is scanned, the cycle counter disables the summing RAM write enable input and requests an interrupt from the microprocessor on line 62 from the computer interface bus 63. Upon interruption, the controlling processor transmits an address signal through line 62 to the 8 bit multiplexer 47 and opens a data path through the 40 bit multiplexer 56 to read the final wedge and ring domain intensity summation results from the summing RAM 46, via line 68. The memory locations of the summing RAM are then set to zero to prepare for the summation cycle for the next video frame. The final Fourier transform analysis may then be performed by a processor external to the video processing unit.

Referring to FIG. 1, the wedge and ring domain intensity values from the detector are transferred to a processor 10. To initialize the optical processing system, the system is presented "good" objects and the data representing a Fourier transform signature of the good object is recorded as a reference. In operation, as each object is inspected by the optical processor, the data representing the Fourier transform of its image is compared by the processor 10 to the Fourier transform signature for the good part. An output signal on line 12 distinguishes acceptable objects from "bad" objects, which represent a different signal for the Fourier transform image.

Alternate embodiments for the detector may include placing either a fixed or variable mask in front of a one or two dimensional detector in order to sample portions of the Fourier transform image. For instance, the mask may be a liquid crystal device having addressable portions disposed in the plane of the Fourier image. Wedge and ring shaped domains may be activated sequentially in the liquid crystal device and the intensity of the Fourier transform may be read on a single photodetector. See, for example, the discussion regarding FIGS. 6-8.

In another alternate embodiment, the Fourier transform of an image could be detected by a standard analog camera array which is rotated or physically moved to identify different wedge and ring shaped domains. The intensity of the light in each domain would then be recorded.

Figure 5:
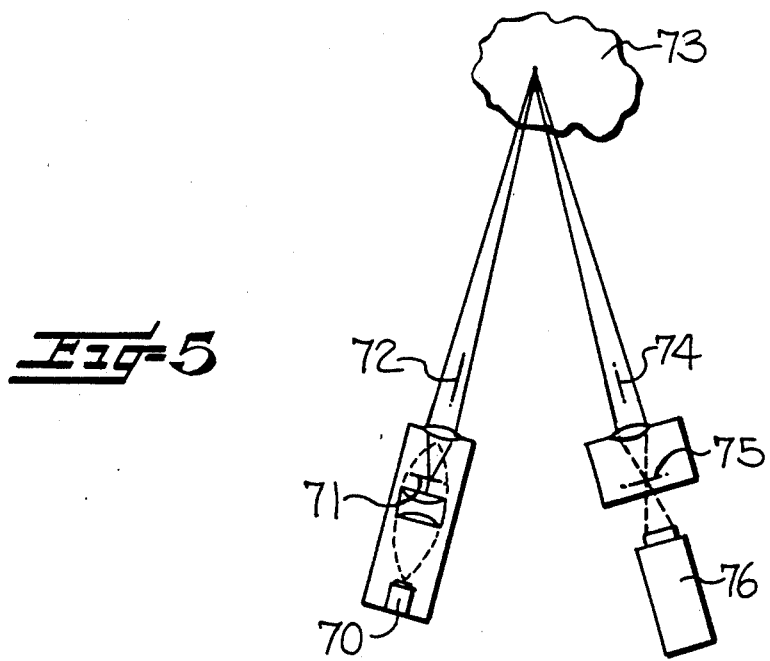
FIG. 5 is a schematic diagram illustrating the generation of Moire fringe patterns for an object.

Referring to FIG. 5, Moire fringes of an object to be inspected are generated and provided to the optical processor rather than the image of the object itself. This preprocessing simplifies the image by essentially identifying only the three dimensional contours. To employ this technique, light is transmitted from a source 70 through fine grating 71 along optical path 72 to the object 73. The light reflected from the object along optical path 74 is viewed through grating 75, which is identical to grating 71. The interference of the projected grating pattern and the viewing pattern results in a beat pattern of alternating light and dark bands known as Moire fringes. These fringes change dramatically with small depth related differences in the object. They can highlight defects by magnifying their effect many times. They also can exclude surface, non-depth related detail since only depth related changes cause differences in the Moire fringes. The fringes are viewed by sensor 76 which corresponds to the video camera 2 in FIG. 1.

Moire preprocessing may also be done using a subtraction technique. First, a Moire fringe pattern of the master object is used as the target grating 75. When the Moire fringes of the object to be tested are superimposed on the known target grating, the elements of the pattern which are the same cancel out, leaving only the differences. Thus, all differences over a certain threshold confirm a defect. And, by determining the spatial frequencies of the defect it may be possible to obtain further information about the nature of the defect.

FIG. 8 illustrates an embodiment of the invention using a different embodiment of a detector. The image of an object 1 to be processed is received by a device such as a video camera 2 that generates a first electrical signal in response to an image from the object. A laser 4 provides a beam of collimated light 5 that is incident upon a spatial light modulator 6. The modulator forms an image of the object in response to the first electrical signal, which ay be preprocessed, and the image is transferred to the coherent light beam. A Fourier transform image of the modulated coherent light beam is formed by the means 7. Via mirror 81 and lens 82, both disposed in the optical path, the Fourier transform image is focused onto the photodetector 83.

A sampling disk 84 is disposed for rotation around its center with a ring of the disk disposed in the optical path. It includes selected opaque and transparent regions to block and transmit light, and may be a glass disk with a patterned opaque coating 89 (See, for example, FIG. 6A) or an opaque metal disk with portions etched away (not shown). The ring portion in the optical path includes a plurality of predetermined wedge and ring patterns that are sequentially inserted into the optical path as the disk rotates. The patterns comprise opaque and transparent regions that selectively block and transmit portions of the Fourier transform image to the detector 83.

FIG. 6 illustrates an embodiment 85 of a suitable sampling disk. It is mounted for rotation around center C. The outer most ring 86 comprises alternating transparent 87 and opaque 88 radially disposed segments which form timing marks for a standard sensing tachometer 112. Inboard of the outer most ring 86 is a concentric ring 90. In the quarter section designated by arc 91, ring 90 includes a plurality of circular masks. Each mask occupies a circular area of approximately the same diameter as the Fourier transform image in the optical path. A portion of the area of each mask is opaque, and it defines a pair of transparent wedge-shaped or pie-shaped segments. Each segment has a predetermined number of arc degrees and is orientated at a predetermined angle. For instance, aperture 92 may include a pair of point-to-point wedges, each wedge being 22.5 arc degrees with one wedge centered at 90 degrees and the other centered at 270 degrees. A second mask 93 in ring 90 may include a pair of wedges also of 22.5 arc degrees each, with the wedges centered at 22.5 degrees and 202.5 degrees. Depending upon the desired degree of resolution or other factors, the number of wedges, the arc degree width of each wedge, and the angular orientation of each wedge may vary as necessary or desirable. For example, two wedges may be used in each mask to improve the signal to noise ratio of the detector, and there may be 16 wedge masks.

In the second quarter circle of ring 90 designated by arc 95 there is a plurality of circular masks 94. Each of these masks is an opaque circle with transparent ring domains located at different diameters ranging from the center of the mask to its outermost portion.

FIG. 7 illustrates an alternate embodiment 100 for a disk having mask zones that generate a composite frequency-orientation signature for the transform image. The interior portion 101 is disposed in the optical path and may be cut or masked to define any of a variety of transparent shapes or openings 102 as necessary or desirable. The outer ring 103 consists of alternating opaque and transparent regions as timing marks.

The mask 84 is attached at its center to a motor shaft 110, as part of motor 111, to rotate the disk with ring 90 or transparent shapes 102 disposed in the optical path to intercept the light beam 5. A standard photosensing tachometer 112 reads the timing track in the outermost ring of the disk. The output signal from the tachometer 112 is provided to a phase lock loop and clock generation circuit 113. This circuit monitors the rotational position of disk 84 and generates a representative signal which is used to synchronize the operation of the photodetector circuitry to each mask on the disk. It also provides a feedback signal to a servo control circuit 114 for controlling the rotational speed of the motor shaft 110.

In operation, each wedge or ring mask on disk 84 transmits one region of the incident Fourier transform image, as illustrated in zones 1-14 of FIG. 4. For instance, wedge domain 93 may provide a reading for zone 12 in FIG. 4, and ring mask 94 may provide a reading that corresponds to zone 2 in FIG. 4. As the disk rotates during the presence of a single Fourier transform image, individual segments of the image fall upon the photodetector 83. Photodetector 83 generates an output signal proportional to the intensity of the transmitted segment of the image. If necessary, the signal is converted to a voltage by means 120, such as a logarithmic current to voltage circuit. The voltage is output on line 120A to sample and hold circuit 121 which, in combination with the disk rotational position signal from the phase lock loop and clock generation circuitry 113 on line 122, provides a signal on line 123 that is a function of the intensity of the sampled portion of the Fourier transform image. Thus, the summing of the intensity in each segment of the Fourier transform image is done optically, rather than electronically by the summing RAM 46 of FIG. 3.

The signal on line 123 is converted to a digital signal by the analog-to-digital conversion means 124, stored in buffer 125, and provided to a data processor 126 for any further analysis or comparison with a known Fourier transform signature. The data processing means 126 may also provide a signal to an optics alignment adjustment means 130 to automatically adjust the position of the mirror 81. This centers the optical path on the appropriate portion of the rotating disk and places it in alignment with the photodiode 83.

In the drawings and specification there have been set forth exemplary embodiments of the invention. It should be understood that while specific terms are employed, they are used in a generic and descriptive sense only and not for purposes of limitation. The claims define the invention and are intended to encompass other embodiments and equivalents that would be apparent to one skilled in the art having the benefit of the teachings of this disclosure.

What is claimed is:

1. A Fourier transform optical processing system comprising:
   a. means for generating a first electrical signal representing an optical image;
   b. means for generating a beam of coherent light and defining an optical path;
   c. means disposed in the optical path downstream from said coherent light beam generating means for modulating the coherent light beam solely in response to said first electrical signal representing the optical image;
   d. means disposed in the optical path downstream from said modulating means for forming a Fourier transform image of the coherent light beam modulated solely in response to said first electrical signal representing the optical image; and
   e. means disposed in the optical path downstream from said Fourier transform image forming means for detecting a predetermined series of angular and radial components of the Fourier transform image of the coherent light beam modulated solely in response to said first electrical signal representing the optical image and for generating a second electrical signal in response to the thus detected series of predetermined angular and radial components of the Fourier transform image.

2. The optical processing system of claim 1 wherein the means for generating a first electrical signal comprises means for generating a composite video signal.

3. The optical processing system of claim 1 wherein the means for modulating the coherent light beam comprises a liquid crystal device.

4. The optical processing system of claim 3 wherein the liquid crystal device includes means for maintaining the liquid crystal device at a predetermined temperature.

5. The optical processing system of claim 4 wherein the means for holding the liquid crystal device at a predetermined temperature further includes means for monitoring the temperature of the liquid crystal device and for providing a feedback signal to the means for holding to maintain the liquid crystal device at the predetermined temperature.

6. The optical processing system of claim 3 wherein the means for modulating the coherent light beam comprises a liquid crystal device, the liquid crystal device comprising a liquid crystal cell disposed between polarizers.

7. The optical processing system of claim 3 wherein the liquid crystal device comprises a liquid crystal cell between polarizers, the polarizers disposed in the optical path and spaced from a liquid crystal cell.

8. The optical processing system of claim 1 wherein the means for modulating the coherent light beam further comprises means for correcting wavefront distortion arising from the means for modulating the coherent light beam.

9. The optical processing system of claim 8 wherein the means for correcting wavefront distortion comprises a hologram, disposed in the optical path of the coherent light beam, having optical properties that are the inverse of any wavefront distortions.

10. The optical processing system of claim 1 wherein the means for modulating the coherent light beam comprises a liquid crystal device including means for generating an entire image on a liquid crystal device.

11. The optical processing system of claim 10 wherein the liquid crystal device comprises a liquid crystal device having an array of individually addressable portions, and the means for generating an entire image on the liquid crystal device comprises means for refreshing selected ones of the individually addressable portions.

12. The optical processing system of claim 1 wherein the means for generating a beam of coherent light comprises means for generating a beam of coherent light having a polarization axis and wherein the means for modulating the coherent light beam comprises means for modulating the coherent light beam having a preferred polarization axis, the polarization axis of the means for generating a beam of coherent light being aligned with the preferred polarization axis of the means for modulating the coherent light beam.

13. The optical processing system of claim 1 wherein the means for generating a beam of coherent light comprises means for polarizing the beam of coherent light for alignment with any polarization axis of the means for modulating the coherent light beam.

14. The optical processing system of claim 1 wherein the means for modulating the coherent light beam comprises a magneto-optic device.

15. The optical processing system of claim 1 wherein the means for modulating the coherent light beam comprises means for generating an image that corresponds to the first image.

16. The optical processing system of claim 1 wherein the means for modulating the coherent light beam comprises a transmissive liquid crystal device.

17. The optical processing system of claim 1 wherein the means for modulating the coherent light beam comprises a reflective liquid crystal device.

18. The optical processing system of claim 1 wherein the means for forming a transform image comprises a holographic optical element that approximates a quadratic wave function for forming a Fourier transform image.

19. The optical processing system of claim 1 wherein the means for forming a transform comprises a holographic optical element comprising the complex conjugate of the phase variation of any elements disposed along the optical path to correct wavefront distortion multiplied by an approximate quadratic phase function, so that wavefront distortion is corrected and a Fourier transform of the image is formed.

20. The optical processing system of claim 1 wherein the means for detecting the transform image comprises means for sampling a Fourier transform image in a plurality of wedge and ring shaped domains.

21. The optical processing system of claim 1 wherein the means for detecting the Fourier transform image comprises a detector having a portion comprising a plurality of ring shaped domains concentrically disposed from the center of the Fourier transform image for detecting radial components of a Fourier transform image.

22. The optical processing system of claim 1 wherein the means for detecting the Fourier transform image comprises a detector having a portion comprising a plurality of wedge shaped domains radially disposed with their points in the center of the Fourier transform for detecting angular components of a Fourier transform image.

23. The optical processing system of claim 1 wherein the means for detecting the transform image and generating a second electrical signal comprises a device that generates an electrical signal in response to an incident light beam.

24. The optical processing system of claim 1 wherein the means for detecting the transform image and generating a second electrical signal comprises a camera that generates an electrical signal in response to an incident light beam.

25. The optical processing system of claim 1 wherein the means for detecting the transform image and generating a second electrical signal comprises a mask means disposed in the optical path for blocking or transmitting selected portions of the coherent light beam and means disposed in the optical path downstream from the mask means for generating the second electrical signal in response to the incident masked light beam.

26. The optical processing system of claim 25 wherein the mask means comprises a fixed mask.

27. The optical processing system of claim 25 wherein the mask means comprises a variable mask.

28. The optical processing system of claim 25 wherein the mask means comprises a liquid crystal device comprising an array of individually addressable portions.

29. The optical processing system of claim 25 wherein the mask comprises means for selectively disposing in the optical path a succession of masks having predetermined wedge and ring shapes.

30. The optical processing system of claim 25 wherein the mask comprises a rotatable disk having a plurality of predetermined wedge and ring shapes disposed at a predetermined radius for successive disposition into the optical path.

31. The optical processing system of claim 1 wherein the means for detecting the Fourier transform image and generating a second electrical signal comprises a mask means for sequentially disposing a series of predetermined wedge and ring shaped transparent mask segments in the optical path for isolating the angular and radial components of the Fourier transform image and transmitting said isolated Fourier transform image components one at a time for a predetermined period of time, and means disposed in the optical path down stream from the mask means for receiving each transmitted Fourier transform image component of the coherent light beam and for generating an electrical signal in response thereto.

32. The optical processing system of claim 1 wherein said means disposed in the optical path comprises means for:
generating a second, unique electrical signal that uniquely identifies the first image independent of signals generated in response to detection of the first image.

33. A method of optically processing using a Fourier transform, the method comprising:
a. generating a first electrical signal representing an optical image;
b. generating a beam of coherent light and defining an optical path;
c. modulating the coherent light beam solely in response to said first electrical signal representing the optical image;
d. forming a Fourier transform image of the coherent light beam modulated solely in response to said first electrical signal representing the optical image; and
e. detecting a predetermined series of angular and radial components of the Fourier transform image of the coherent light beam modulated solely in response to said first electrical signal representing the optical image and generating a second electrical signal in response to the thus detected series of predetermined angular and radial components of the Fourier transform image.

34. The method of claim 33 wherein the step of generating a first electrical signal comprises generating a composite video signal.

35. The method of claim 33 wherein the step of modulating the coherent light beam comprises modulating the coherent light beam by transmitting it through a liquid crystal device responsive to the electrical signal representing the first optical image.

36. The method of claim 33 wherein the step of modulating the coherent light beam comprises modulating the coherent light beam by reflecting it from a liquid crystal device responsive to the electrical signal representing the first optical image.

37. The method of claim 33 further comprising the step of correcting any wavefront distortion arising from the means for modulating the coherent light beam.

38. The method of claim 37 wherein the step of correcting wavefront distortion comprises disposing, in the optical path of the coherent light beam, a hologram having optical properties that are the inverse of any wavefront distortions.

39. The method of claim 33 wherein the step of modulating the coherent light beam comprises generating an entire image on a liquid device disposed in the optical path.

40. The method of claim 39 wherein the step of generating an entire image on the liquid crystal device comprises refreshing selected ones of the individually addressable pixel portions of the liquid crystal device.

41. The method of claim 33 wherein the step of detecting the transform image comprises using a series of wedge and ring shaped domains to sample a Fourier transform image.

42. The method of claim 33 wherein the step of detecting the transform and generating a second electrical signal comprises detecting a Fourier transform and digitizing at least a portion of the Fourier transform image.

43. The method of claim 33 wherein the step of detecting the transform image and generating a second electrical signal comprises selectively masking portions of the coherent light beam and generating the second electrical signal in response to the incident masked light beam.

44. The method of claim 43 wherein the step of selectively masking comprises varying the mask with respect to time.